Sept. 22, 1936.　　　T. COLLA ET AL　　　2,055,402
SIGNAL
Filed Dec. 4, 1934
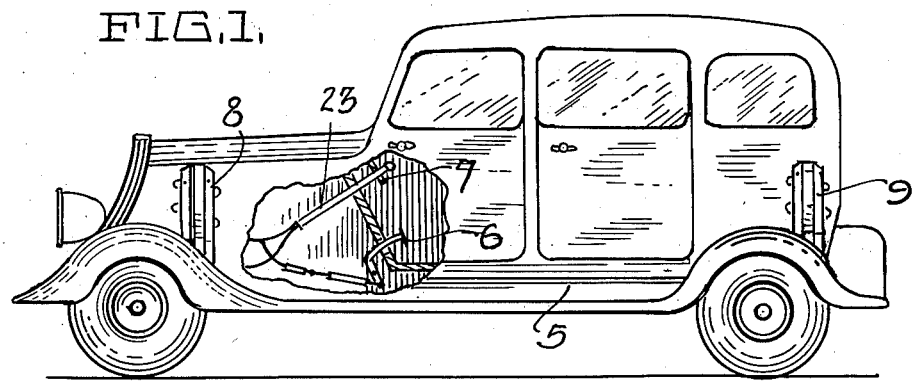
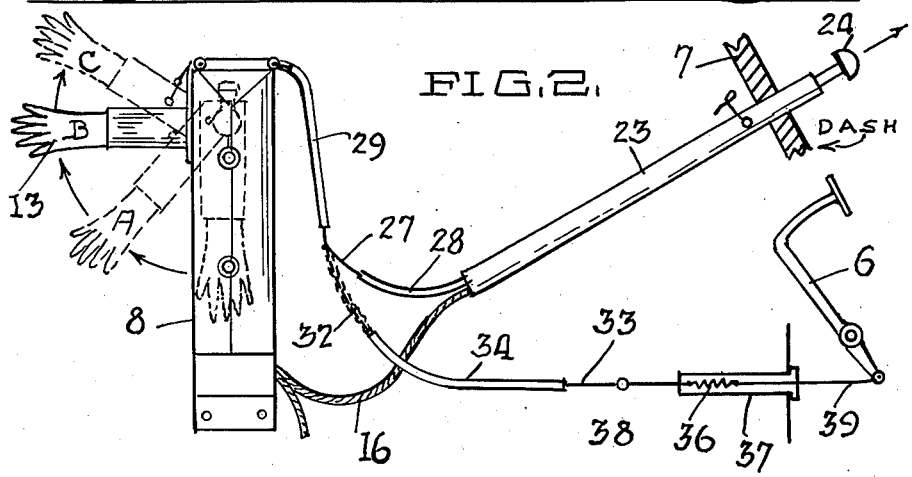
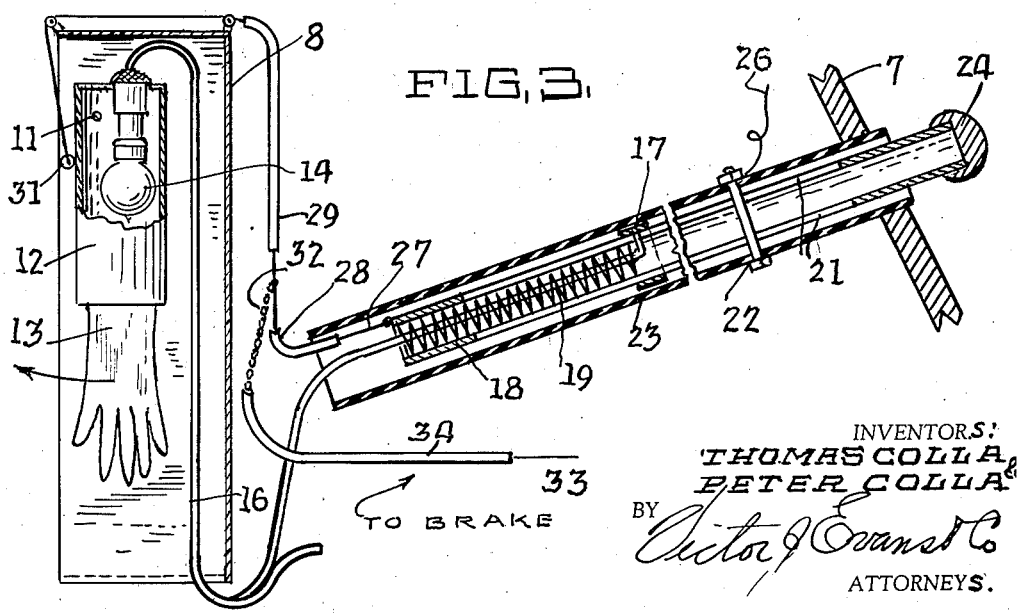
INVENTORS:
THOMAS COLLA &
PETER COLLA
BY
ATTORNEYS.

Patented Sept. 22, 1936

2,055,402

UNITED STATES PATENT OFFICE 2,055,402

SIGNAL

Thomas Colla and Peter Colla, Merced, Calif.

Application December 4, 1934, Serial No. 755,946

1 Claim. (Cl. 177—327)

This invention relates to improvements in signals and has particular reference to a signal for use on motor vehicles to indicate to a person the intentions of the driver of the vehicle in executing various maneuvers.

A further object is to produce a device which may be attached to the ordinary motor vehicle, without altering its construction.

A further object is to produce a device whereby the signal will be automatically moved into stop position upon applying the foot brake.

A still further object is to produce a device which is economical to manufacture and install.

Other objects and advantages will be apparent during the course of the following description.

In the accompanying drawing forming a part of this specification and in which like numerals are employed to designate like parts throughout the same, Fig. 1 is a side elevation of a motor vehicle having our signal applied thereto, Fig. 2 is a diagrammatic view showing the arrangement for manipulating the signal, and Fig. 3 is an enlarged diagrammatic view showing certain parts in cross section to illustrate the illuminating feature.

Most states have laws which require that the operator of a vehicle give a signal previous to stopping or executing a left or right hand turn. It has been customary to give this signal by extending the arm out of the window adjacent the driver and in inclement weather many drivers fail to give the signal due to the desire not to reach the hand and arm into the rain or sleet. Applicants have, therefore, devised a signal which may be placed upon the vehicle, which signal has an arm representing a portion of the human arm and hand, which may be moved into various positions as required by law.

In the accompanying drawing wherein for the purpose of illustration is shown a preferred embodiment of my invention, the numeral 5 designates a motor vehicle as a whole having the customary brake pedal 6 and instrument board 7. Positioned upon the front fender is a housing 8 and upon the rear fender a housing 9. In each of these housings is pivoted, as at 11, an arm 12 carrying a hand 13. Under normal conditions this hand remains in the position shown in Fig. 3. As both of the signals in the cases 8 and 9 are identical, but one will be described.

By referring to Fig. 3 it will be noted that an illuminating element 14 is positioned within the arm and is connected by a cable 16 to a contact 17 mounted upon a sliding tube 18 of insulating material. This contact 17 is slidable upon the tube 18 and is normally held in the position of Fig. 3 by a spring 19 mounted within the tube 18. Slots 21 formed in the tube 18 permit a bolt 22 to pass therethrough, which bolt is mounted in a tubular casing 23 of insulating material, one end of which is secured to the dash 7. A handle 24 permits the tube 18 to be moved in the tube 23. A wire 26 is connected to the bolt 22 and to the live side of the battery of the car. It is, of course, obvious that the bulb 14 has one side thereof grounded as is customary practice in motor vehicles. A pull wire 27 has one end secured to the sliding tube and is passed through conduits 28 to a position adjacent the top of the casing 8 or 9 as the case may be (it may be here noted that in order to simplify the drawing the connection to the signal in the casing 9 has been omitted). This wire 27 has its opposite end connected as at 31 to the arm 12. At a convenient point in the length of the wire 27 a chain 32 is connected to a pull wire 33, which also passes through suitable conduits 34 and has its free end connected to a spring 36 mounted within a tubular support 37. A stop 38 is positioned upon the wire 33, the purpose of which will be later seen. Attached to the opposite end of the spring 36 is a wire 39 which is in turn connected to the lower extremity of the brake pedal 6.

The result of this construction is that when the signals are mounted upon the motor vehicle as shown in Fig. 1 and the operator steps upon the brake pedal 6, the wire 33 will be pulled which will transmit the pull through the chain 32 to the wire 27 and consequently the arm 12 will be raised to the position A of Fig. 2. As soon as the stop 38 engages the end of the tubular member 37 further pull upon the wire will be arrested and further movement of the pedal 6 will be permitted through the stretching of the spring 36. As soon as the pressure on the pedal is released the parts will return to their normal position. When it is desired to give a left or right hand turn signal, the operator grasps the handle 24 and pulls upon the tube 18. This movement causes the band 17 to engage the bolt 22 and to establish an electric circuit from the wire 26 through the ring 17 and cable 16 to the bulb 14 and at the same time movement of the tube 18 will pull upon the wire 27 and cause the arm 12 to move to either the position B or C, depending upon the amount of the pull. The fact that the band 17 may slide upon the tube, permits the establishment of the electric circuit and the holding of the same irrespective of the amount of movement of the tube. The wire 40 is attached to the ordinary stop light and causes the same to be illuminated whenever the signal is actuated.

It is to be understood that the form of my invention herewith shown and described is to be taken as a preferred example of the same and that various changes relative to the material, size, shape and arrangement of parts may be resorted to without departing from the spirit of the invention or the scope of the subjoined claim.

Having thus described our invention, we claim:—

In a device of the character described, a signal arm, means mounting the arm on a vehicle for movement to a plurality of different positions, a lamp carried by the arm having one terminal connected to ground, an operating device for said arm comprising a fixed tube mounted on said vehicle, a second tube of insulating material mounted for sliding movement within said fixed tube and having opposite and parallel slots for a portion of its length, an operator connected to one end of said second tube, a connecting means between the other end of said second tube and the signal arm for moving the latter on movement of the tube, a conductor wire extending from the other terminal of said lamp into said second tube, a ring contact mounted for sliding movement on said second tube and connected to said conductor through one of the slots, spring means for resiliently positioning said contact on said second tube, a stationary contact mounted on said fixed tube and extending through the slots of the second tube in a position to be engaged by said ring contact when the second tube is moved to operate the signal arm, and a source of current having one terminal grounded and the other terminal connected to said stationary contact.

THOMAS COLLA.
PETER COLLA.